(12) United States Patent
Ding et al.

(10) Patent No.: US 10,355,809 B2
(45) Date of Patent: Jul. 16, 2019

(54) CHANNEL STATE INFORMATION FEEDBACK METHOD AND USER EQUIPMENT

(71) Applicant: Sharp Kabushiki Kaisha, Osaka-shi, Osaka (JP)

(72) Inventors: Ming Ding, Pudong (CN); Lei Huang, Pudong (CN); Zeng Yang, Pudong (CN); Renmao Liu, Pudong (CN)

(73) Assignee: SHARP KABUSHIKI KAISHA, Sakai (JP)

( * ) Notice: Subject to any disclaimer, the term of this patent is extended or adjusted under 35 U.S.C. 154(b) by 230 days.

(21) Appl. No.: 14/726,787

(22) Filed: Jun. 1, 2015

(65) Prior Publication Data
US 2015/0295677 A1   Oct. 15, 2015

Related U.S. Application Data

(63) Continuation of application No. 13/978,220, filed as application No. PCT/JP2012/051581 on Jan. 19, 2012, now abandoned.

(30) Foreign Application Priority Data

Jan. 20, 2011   (CN) .......................... 2011 1 0022221

(51) Int. Cl.
*H04L 1/00*   (2006.01)
*H04W 8/24*   (2009.01)
(Continued)

(52) U.S. Cl.
CPC .......... *H04L 1/0003* (2013.01); *H04L 5/0048* (2013.01); *H04W 8/24* (2013.01);
(Continued)

(58) Field of Classification Search
None
See application file for complete search history.

(56) References Cited

U.S. PATENT DOCUMENTS

2009/0163142 A1* 6/2009 Pi .......................... H04L 1/0026
455/62
2010/0291940 A1* 11/2010 Koo ....................... H04B 7/024
455/450

(Continued)

OTHER PUBLICATIONS

Ding et al., "Channel State Information Feedback Method and User Equipment", U.S. Appl. No. 13/978,220, filed Jul. 3, 2013.

*Primary Examiner* — Hassan Kizou
*Assistant Examiner* — Hector Reyes
(74) *Attorney, Agent, or Firm* — Keating & Bennett, LLP (57) ABSTRACT

A Channel State Information (CSI) feedback method and a User Equipment (UE) are disclosed. The method comprises the following steps of: determining a set of coordinated Base Stations (BSs) participating multi-BS coordination, the set of coordination BSs containing a serving BS and at least one non-serving BS; for each BS in the set of coordinated BSs: calculating a Signal to Interference and Noise Ratio (SINR) for a channel between a UE and the BS based on a hypothetical BS coordination mode corresponding to the BS; and deriving a Channel Quality Index (CQI) corresponding to the calculated SINR and feeding back the derived CQI to the serving BS.

4 Claims, 7 Drawing Sheets

(51) Int. Cl.
*H04W 24/02* (2009.01)
*H04L 5/00* (2006.01)
H04W 88/08 (2009.01)
H04W 28/04 (2009.01)

(52) U.S. Cl.
CPC .......... *H04W 24/02* (2013.01); *H04W 28/04* (2013.01); *H04W 88/08* (2013.01)

(56) References Cited

U.S. PATENT DOCUMENTS

| | | | |
|---|---|---|---|
| 2011/0032835 A1* | 2/2011 | Zhu | H04L 1/0026 370/252 |
| 2011/0110449 A1* | 5/2011 | Ramprashad | H04L 1/0003 375/261 |
| 2012/0189077 A1* | 7/2012 | Seo | H04B 7/024 375/267 |

* cited by examiner

CHANNEL STATE INFORMATION FEEDBACK METHOD AND USER EQUIPMENT

TECHNICAL FIELD

The invention relates to communication technology, and more particularly, to a Channel State Information (CSI) feedback method in a multi-Base Station (BS) coordination mode and a User Equipment (UE) applying the same.

BACKGROUND ART

Figure 1:
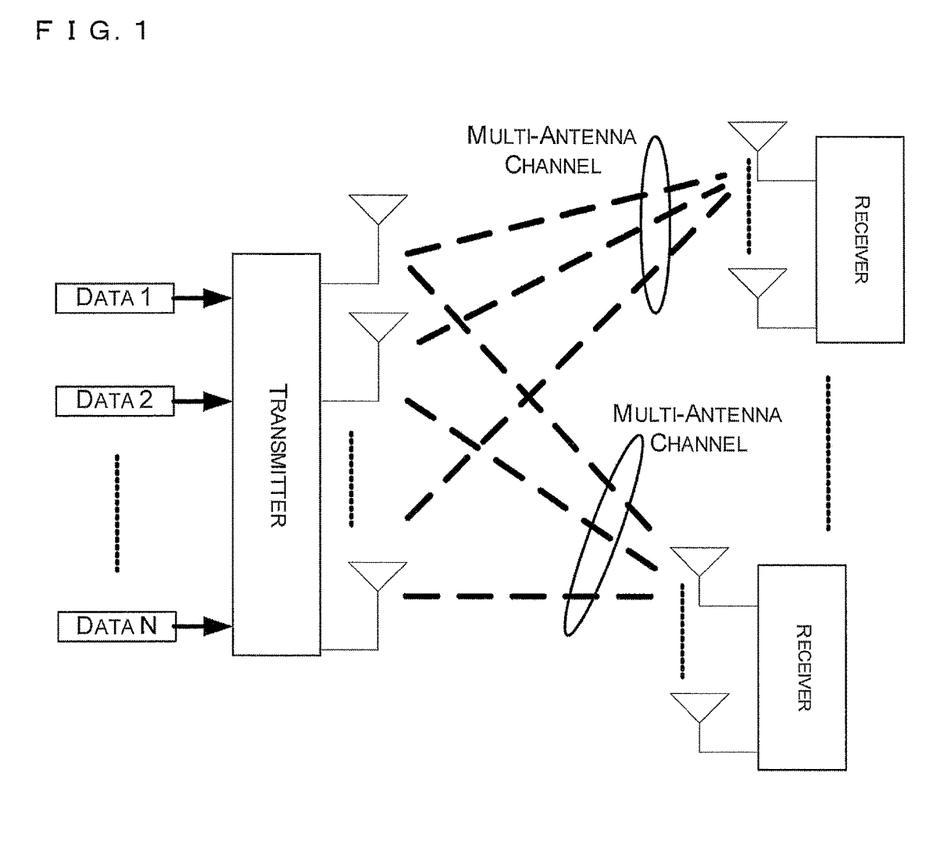
FIG. 1 is a schematic diagram of a MIMO system.

Multi-antenna wireless transmission technique, or Multiple In Multiple Out (MIMO), can achieve spatial multiplex gain and spatial diversity gain by deploying a plurality of antennas at both the transmitter and the receiver and utilizing the spatial resources in wireless transmission. Researches on information theory have shown that the capacity of a MIMO system grows linearly with the minimum of the number of transmitting antennas and the number of receiving antennas. FIG. 1 shows a schematic diagram of a MIMO system. As shown in FIG. 1, a plurality of antennas at the transmitter and a plurality of antennas at each of the receivers constitute a multi-antenna wireless channel containing spatial domain information. Further, Orthogonal Frequency Division Multiplexing (OFDM) technique has a strong anti-fading capability and high frequency utilization and is thus suitable for high speed data transmission in a multi-path and fading environment. The MIMO-OFDM technique, in which MIMO and OFDM are combined, has become a core technique for a new generation of mobile communication.

For instance, the 3rd Generation Partnership Project (3GPP) organization is an international organization in mobile communication field and plays an important role in standardization of 3G cellular communication technologies. Since the second half of the year 2004, the 3GPP organization has initiated a so-called Long Term Evolution (LTE) project for designing Evolved Universal Terrestrial Radio Access (EUTRA) and Evolved Universal Terrestrial Radio Access Network (EUTRAN). The MIMO-OFDM technique is employed in the downlink of the LTE system. In a conference held in Shenzhen, China in April 2008, the 3GPP organization started a discussion on the standardization of 4G cellular communication systems (currently referred to as LTE-A systems). In this conference, a concept known as "multi-antenna multi-BS coordination" gets extensive attention and support. Its core idea is that multiple BSs can provide communication services for one or more UEs simultaneously, so as to improve data transmission rate for a UE located at the edge of a cell.

With regard to the multi-antenna multi-BS coordination, fundamental agreements are mainly available from the following standard document by March, 2010: 3GPP TR 36.814 V9.0.0 (2010-03), "Further advancements for E-UTRA physical layer aspects (Release 9)", which can be outlined as follows:

In a multi-antenna multi-BS service, a UE needs to report channel state/statistical information of a link between the UE and each BS/cell in a set of cells. This set of cells is referred to as a measurement set for multi-antenna multi-BS transmission.

The set of BSs/cells for which the UE actually perform information feedback can be a subset of the measurement set and is referred to as a coordination set for multi-antenna multi-BS transmission. Here, the coordination set for multi-antenna multi-BS transmission can be the same as the measurement set for multi-antenna multi-BS transmission.

A BS/cell in the coordination set for multi-antenna multi-BS transmission participates in Physical Downlink Shared Channel (PDSCH) transmission for the UE, either directly or indirectly.

The scheme in which multiple BSs directly participate in coordination transmission is referred to as Joint Processing (JP). The JP scheme needs to share PDSCH signal of the UE among the multiple BSs participating the coordination and can be divided into two approaches. One is referred to as Joint Transmission (JT) in which the multiples BSs transmit their PDSCH signals to the UE simultaneously. The other one is referred to as Dynamic Cell Selection (DCS) in which at any time instance, only one of the BSs which has the strongest signal link is selected to transmit its PDSCH signal to the UE.

The scheme in which multiple BSs indirectly participate in coordination transmission is referred to as Coordinated Beamforming/Coordinated Scheduling (CB/CS). In this CB/CS scheme, instead of sharing PDSCH signal of the UE among the multiple BSs participating in the coordination, the beams/resources for transmission of PDSCHs for different UEs are coordinated among the multiple BSs to suppress the interference between each other.

For a UE operating in the multi-antenna multi-BS coordinated transmission environment, information feedback is mainly carried out separately for each BS and is transmitted over the uplink resources of the serving BS.

As used herein, the term "information feedback" refers to a process in which a UE needs to feed back CSI to a BS such that the BS can perform corresponding operations such as radio resource management. There are primarily the following three CSI feedback approaches in the prior art documents.

Figure 2:
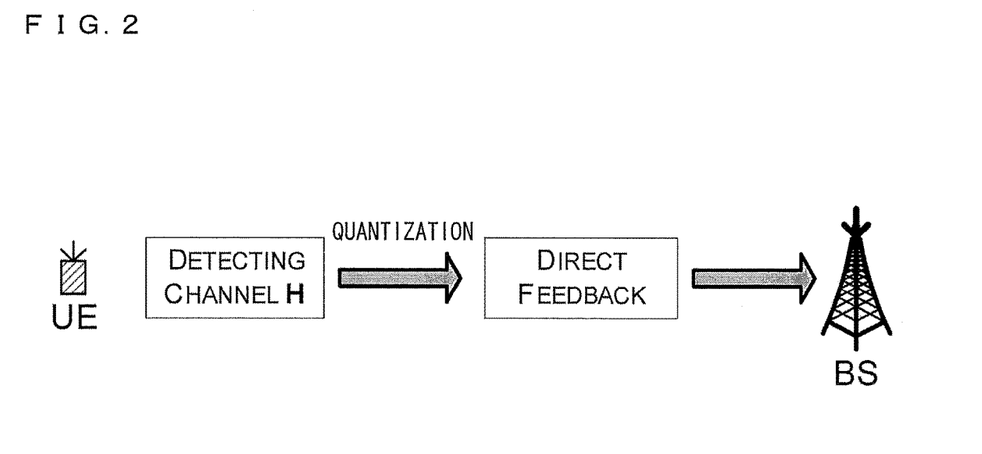
FIG. 2 is a schematic diagram of complete CSI feedback.

Complete CSI Feedback: The UE quantizes all elements in a transceiver channel matrix and feeds back each of the elements to the BS. Alternatively, the UE can analogously modulate all elements in the transceiver channel matrix and feeds back them to the BS. Alternatively, the UE can obtain a transient covariance matrix for the transceiver channel matrix, quantizes all elements in the covariance matrix and feeds back each of the elements to the BS. Thus, the BS can reconstruct an accurate channel from the channel quantization information fed back from the UE. This approach is described in non-patent document 1: 3GPP R1-093720, "CoMP email summary", Qualcomm and its implementation is illustrated in FIG. 2.

Figure 3:
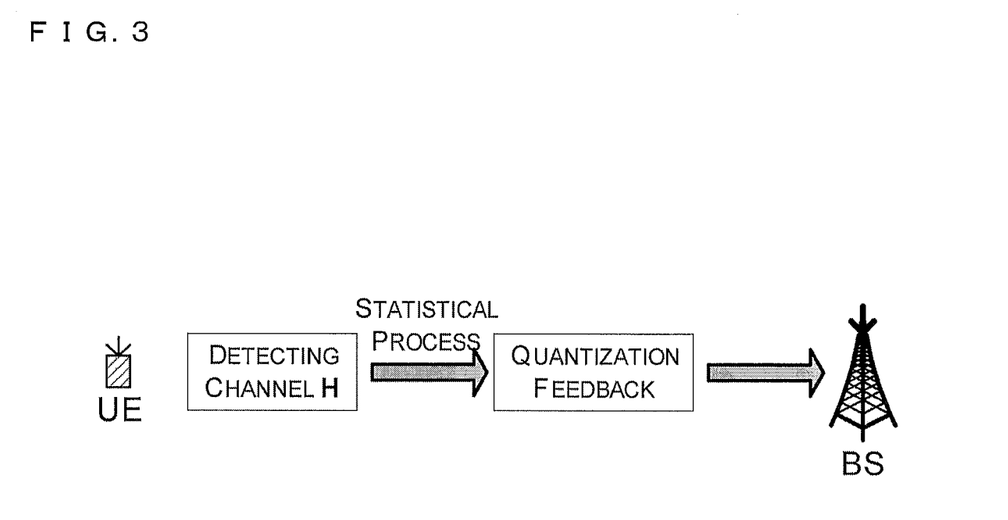
FIG. 3 is a schematic diagram of statistic-based CSI feedback.

Statistic-Based CSI Feedback: The UE applies a statistical process on a transceiver channel matrix, e.g., calculating a covariance matrix thereof, quantizes the statistical information and then feeds back it to the BS. Thus, the BS can obtain statistical state information of the channel based on the feedback from the UE. This approach is described in non-patent document 1: 3GPP R1-093720, "CoMP email summary", Qualcomm and its implementation is illustrated in FIG. 3.

Figure 4:
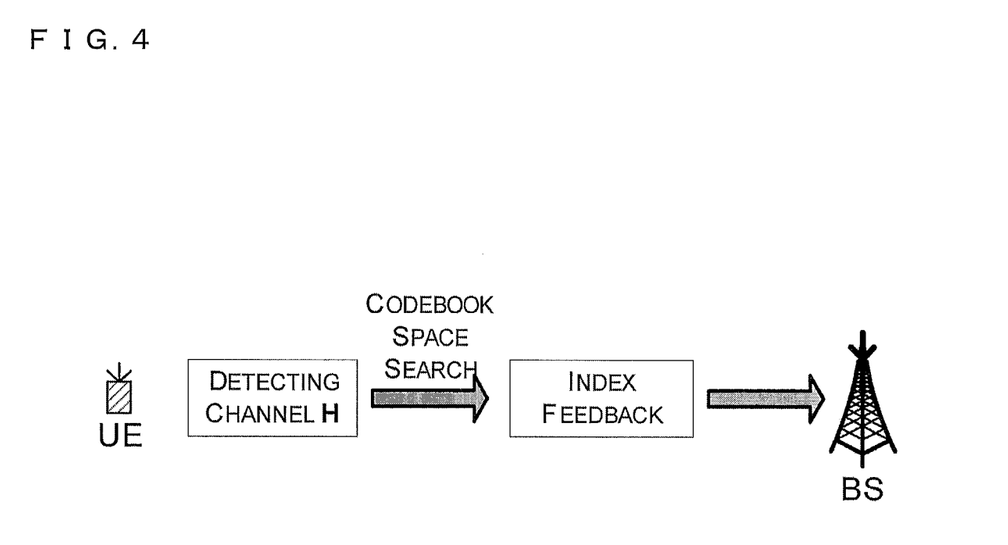
FIG. 4 is a schematic diagram of CSI feedback based on codebook space search.

CSI Feedback Based on Codebook Space Search: A finite set of CSI is predefined by the UE and the BS (i.e., codebook space, common codebook spaces including channel rank and/or pre-coding matrix and/or channel quality indication, etc.). Upon detection of a transceiver channel matrix, the UE searches in the codebook space for an element best matching the CSI of the current channel matrix and feeds back the index of the element to the BS. Thus, the BS looks up the predefined codebook space based on the index to obtain rough CSI. This approach is described in non-patent document 2: 3GPP, R1-083546, "Per-cell precoding methods for downlink joint processing CoMP", ETRI, and its implementation is illustrated in FIG. 4.

Among the above three approaches, the complete CSI feedback has the best performance, but is impractical to be applied to actual system due to the highest feedback overhead. In particular, in the multi-antenna multi-BS coordination system, its feedback overhead grows in proportional to the increase of the number of BSs and it is even more impractical. The CSI feedback based on codebook space search has the lowest feedback overhead, but is worst in terms of performance since it cannot accurately describe the channel state such that the transmitter cannot make full use of channel characteristics and cannot the perform transmission accordingly. However, it is extremely simple to implement and can typically accomplish feedback with a few bits. Hence, it is widely applied in actual systems. The statistic-based CSI feedback achieves a good tradeoff between these two approaches. When the channel state has significant statistical information, this approach can accurately describe the channel state with a relatively small amount of feedback, thereby achieving a relatively ideal performance.

Currently, in the LTE and the LTE-A systems, in consideration of factors for practical system implementation, the CSI feedback based on codebook space search is employed in a single cell transmission mode. In the multi-BS/cell coordination mode in the LTE-A system, it is expected that this CSI feedback based on codebook space search will continue to be used. Therefore, the present invention will be described also with respect to this feedback approach.

For the CSI feedback based on codebook space search, there are two feedback channels in the LTE system, a Physical Uplink Control CHannel (PUCCH) and a Physical Uplink Shared CHannel (PUSCH). In general, the PUCCH is configured for transmission of synchronized, basic CSI with low payload; while PUSCH is configured for transmission of bursty, extended CSI with high payload. For the PUCCH, a complete CSI is composed of different feedback contents which are transmitted in different sub-frames. For the PUSCH, on the other hand, a complete CSI is transmitted within one sub-frame. Such design principles remain applicable in the LET-A system.

The feedback contents can be divided into three categories: Channel Quality Index (CQI), Pre-coding Matrix Index (PMI) and Rand Index (RI), all of which are bit quantized feedbacks. The CQI typically corresponds to a transmission format having a packet error rate no more than 0.1.

In the LTE system, the following eight types of MIMO transmission approaches for downlink data are defined:

1) Single antenna transmission. This is used for signal transmission at a single antenna BS. This approach is a special instance of MIMO system and can only transmit a single layer of data.

2) Transmission diversity. In a MIMO system, diversity effects of time and/or frequency can be utilized to transmit signals, so as to improve the reception quality of the signals. This approach can only transmit a single layer of data.

3) Open-loop space division multiplexing. This is a space division multiplexing without the need for PMI feedback from UE.

4) Closed-loop space division multiplexing. This is a space division multiplexing in which PMI feedback from UE is required.

5) Multi-user MIMO. There are multiple UEs simultaneously participating in the downlink communication of the MIMO system.

6) Closed-loop single layer pre-coding. Only one single layer of data is transmitted using the MIMO system. The PMI feedback from UE is required.

7) Beam forming transmission. The beam forming technique is employed in the MIMO system. A dedicated reference signal is used for data demodulation at UE. Only one single layer of data is transmitted using the MIMO system. The PMI feedback from UE is not required.

8) Two-layer beam forming transmission. The UE can be configured to feed back PMI and RI, or not to feed back PMI and RI.

In the LTE-A system, the above eight types of transmission approaches may be retained and/or canceled, and/or a new transmission approach, dynamic MIMO switching, can be added, by which the BS can dynamically adjust the MIMO mode in which the UE operates.

In order to support the above MIMO transmission approaches, a variety of CSI feedback modes are defined in the LTE system. Each MIMO transmission approach corresponds to a number of CSI feedback modes, as detailed in the following.

There are four CSI feedback modes for the PUCCH, Mode 1-0, Mode 1-1, Mode 2-0 and Mode 2-1. These modes are combination of four types of feedbacks, including:

1) Type 1: one preferred sub-band location in a Band Part (BP, which is a subset of the Set S and has its size dependent on the size of the Set S) and a CQI for the sub-band. The respective overheads are L bits for the sub-band location, 4 bits for the CQI of the first codeword and 3 bits for the CQI of the possible second codeword which is differentially coded with respect to the CQI of the first codeword.

2) Type 2: broadband CQI and PMI. The respective overheads are 4 bits for the CQI of the first codeword, 3 bits for the CQI of the possible second codeword which is differentially coded with respect to the CQI of the first codeword and 1, 2 or 4 bits for PMI depending on the antenna configuration at BS. 3) Type 3: RI. The overhead for RI is 1 bit for two antennas, or 2 bits for four antennas, depending on the antenna configuration at BS.

4) Type 4: broadband CQI. The overhead is constantly 4 bits.

The UE feeds back different information to the BS in correspondence with the above different types.

The Mode 1-0 is a combination of Type 3 and Type 4. That is, the feedbacks of Type 3 and Type 4 are carried out at different periods and/or with different sub-frame offsets. In the Mode 1-0, the broadband CQI of the first codeword in the Set S and possibly the RI information are fed back.

The Mode 1-1 is a combination of Type 3 and Type 2. That is, the feedbacks of Type 3 and Type 2 are carried out at different periods and/or with different sub-frame offsets. In the Mode 1-1, the broadband PMI of the Set S, the broadband CQIs for the individual codewords and possibly the RI information are fed back.

The Mode 2-0 is a combination of Type 3, Type 4 and Type 1. That is, the feedbacks of Type 3, Type 4 and Type 1 are carried out at different periods and/or with different sub-frame offsets. In the Mode 2-0, the broadband CQI of the first codeword in the Set S, possibly the RI information as well as one preferred sub-band location in the BP and the CQI for the sub-band are fed back.

The Mode 2-1 is a combination of Type 3, Type 2 and Type 1. That is, the feedbacks of Type 3, Type 2 and Type 1 are carried out at different periods and/or with different sub-frame offsets. In the Mode 2-1, the broadband PMI of the Set S, the broadband CQIs for the individual codewords and possibly the RI information, as well as one preferred sub-band location in the BP and the CQI for the sub-band are fed back.

There are thus the following correspondences between the MIMO transmission approaches and the CSI feedback modes:

MIMO transmission approach 1): Mode 1-0 and Mode 2-0;

MIMO transmission approach 2): Mode 1-0 and Mode 2-0;

MIMO transmission approach 3): Mode 1-0 and Mode 2-0;

MIMO transmission approach 4): Mode 1-1 and Mode 2-1;

MIMO transmission approach 5): Mode 1-1 and Mode 2-1;

MIMO transmission approach 6): Mode 1-1 and Mode 2-1;

MIMO transmission approach 7): Mode 1-0 and Mode 2-0;

MIMO transmission approach 8): Mode 1-1 and Mode 2-1, with PMI/RI feedback from UE; or : Mode 1-0 and Mode 2-0, without PMI/RI feedback from UE.

Still, CQI, PMI and RI are primary feedback contents in the single BS transmission approach of the LTE-A system. In order that the feedback modes for a UE are consistent with those corresponding to the transmission approaches 4) and 5), the Mode 1-1 and Mode 2-1 in the LTE-A system are optimized for a scenario where a BS is equipped with 8 transmission antennas. That is, a PMI is collectively determined from two channel pre-coding matrix indices, W1 and W2, where W1 represents broadband/long-term channel characteristics and W2 represents sub-band/short-term channel characteristics. For transmission of W1 and W2 over PUCCH, Mode 1-1 can be sub-divided into two sub-modes: Mode 1-1A and Mode 1-1B. In Mode 1-1A, the RI and the down-sampled W1 are jointly coded and then fed back as Type 3 and W2 is fed back as Type 2. In Mode 1-1B, the down-sampled W1 and the down-sampled W2 are jointly coded and fed back as Type 2. Accordingly, Mode 2-1 can also be sub-divided into two sub-modes: Mode 2-1A and Mode 2-1B. In both Mode 2-1A and Mode 2-1B, the RI and 1-bit information known as Pre-coding Type Indicator (PTI) are jointly coded and fed back as Type 3. The PTI having a value of 0 and 1 indicates that the corresponding sub-mode is Mode 2-1A and Mode 2-1B, respectively. In Mode 2-1A, W1 is fed back as Type 2 and the broadband W2 is fed back as Type 1, while in Mode 2-1B, the broadband W2 is fed back as Type 2 and the sub-band W2 is fed back as Type 1. It is to be noted that the Type 1 as used herein differs from the Type 1 defined in LTE Release 8 in that not only the CQI but also the corresponding PMI need to be fed back. In this regard, reference can be made to 3GPP R1-106514, "Way Forward on further details about PUCCH".

In summary, there are currently few references available for the CSI feedback for multi-antenna multi-BS coordination in the LTE-A system, as this has not been discussed in the standardization process. At present, the general concept is that the feedback contents involve CSI based on codebook space search, such as CQI, PMI and RI, and the information feedback is mainly carried out separately to each BS. In this architecture, there are still a number of issues to be researched. In particular, it is an important topic on how to define the CQI in the CSI for the multi-BS coordination environment and how to design the feedback method thereof, so as to be suitable for the JT, DCS and CB/CS transmission.

SUMMARY OF INVENTION

It is an object of the present invention to solve the problem of insufficient and inoperable downlink multi-BS CSI definition and feedback in the prior art by providing a novel CSI feedback method and a UE.

According to the first aspect of the present invention, a Channel State Information (CSI) feedback method is provided, which includes the following steps of: determining a set of coordinated Base Stations (BSs) participating multi-BS coordination, the set of coordination BSs containing a serving BS and at least one non-serving BS; for each BS in the set of coordinated BSs: calculating a Signal to Interference and Noise Ratio (SINR) for a channel between a UE and the BS based on a hypothetical BS coordination mode corresponding to the BS; and deriving a Channel Quality Index (CQI) corresponding to the calculated SINR and feeding back the derived CQI to the serving BS.

Preferably, in the step of calculating SINR, the hypothetical BS coordination mode corresponding to the serving BS in the set of coordinated BSs is a single BS transmission mode without coordination.

Preferably, in the step of calculating SINR, the hypothetical BS coordination mode corresponding to each non-serving BS in the set of coordinated BSs is one of a single BS transmission mode without coordination, a multi-BS joint transmission mode, a coordinated beamforming/coordinated scheduling mode and a dynamic cell selection mode.

Preferably, in the step of calculating SINR, an SINR for a non-serving BS is calculated in consideration of interferences from all other non-serving BSs in the set of coordinated BSs than the non-serving BS.

Preferably, in the step of calculating SINR, an SINR for a non-serving BS corresponding to the multi-BS joint transmission mode, the coordinated beamforming/coordinated scheduling mode or the dynamic cell selection mode is calculated in consideration of background interference and noise only.

Preferably, the method further includes: feeding back phase information associated with each non-serving BS corresponding to the multi-BS joint transmission mode to the serving BS.

Preferably, the step of deriving CQI includes: deriving a CQI corresponding to the calculated SINR based on a mapping relationship between SINR and CQI.

Preferably, the mapping relationship is obtained by shifting and extended filling a modulation and coding table in a Long Term Evolution (LTE) system.

Preferably, the mapping relationship is obtained by selecting, at non-linear intervals, and extended filling a modulation and coding table in a Long Term Evolution (LTE) system.

According to the second solution of the present invention, a User Equipment (UE) is provided, which includes: a coordinated BS set determining unit configured for determining a set of coordinated Base Stations (BSs) participating multi-BS coordination, the set of coordination BSs containing a serving BS and at least one non-serving BS; a Signal to Interference and Noise Ratio (SINR) calculating unit configured for calculating, for each BS in the set of coordinated BSs, an SINR for a channel between a UE and the BS based on a hypothetical BS coordination mode corresponding to the BS; a Channel Quality Index (CQI)

deriving unit configured for deriving, for each BS in the set of coordinated BSs, a CQI corresponding to the calculated SINR; and a feedback unit configured for feeding back the derived CQI to the serving BS.

Preferably, the SINR calculating unit is configured for: setting the hypothetical BS coordination mode corresponding to the serving BS in the set of coordinated BSs as a single BS transmission mode without coordination.

Preferably, the SINR calculating unit is configured for: setting the hypothetical BS coordination mode corresponding to each non-serving BS in the set of coordinated BSs as one of a single BS transmission mode without coordination, a multi-BS joint transmission mode, a coordinated beamforming/coordinated scheduling mode and a dynamic cell selection mode.

Preferably, the SINR calculating unit is configured for: calculating an SINR for a non-serving BS in consideration of interferences from all other non-serving BSs in the set of coordinated BSs than the non-serving BS.

Preferably, the SINR calculating unit is configured for: calculating an SINR for a non-serving BS corresponding to the multi-BS joint transmission mode, the coordinated beamforming/coordinated scheduling mode or the dynamic cell selection mode in consideration of background interference and noise only.

Preferably, the feedback unit is further configured for: feeding back phase information associated with each non-serving BS corresponding to the multi-BS joint transmission mode to the serving BS.

Preferably, the CQI deriving unit is configured for: deriving a CQI corresponding to the calculated SINR based on a mapping relationship between SINR and CQI.

Preferably, the CQI deriving unit is further configured for: obtaining the mapping relationship by shifting and extended filling a modulation and coding table in a Long Term Evolution (LTE) system.

Preferably, the CQI deriving unit is further configured for: obtaining the mapping relationship by selecting, at non-linear intervals, and extended filling a modulation and coding table in a Long Term Evolution (LTE) system.

As such, the CSI feedback method and the UE provided for the multi-BS coordination mode according to the present invention have the advantages of simple implementation and low signaling overhead.

BRIEF DESCRIPTION OF DRAWINGS

The above and other objects, features and advantages of the present invention will be more apparent from the following preferred embodiments illustrated with reference to the figures, in which.

DESCRIPTION OF EMBODIMENTS

Preferred embodiments of the present invention will be detailed with reference to the drawings. In the following description, details and functions unnecessary to the present invention are omitted so as not to obscure the concept of the invention.

For clear and detailed explanation of the implementation steps of the present invention, some specific examples applicable to the LTE-A cellular communication system are given below. Herein, it is to be noted that the present invention is not limited to the application exemplified in the embodiments. Rather, it is applicable to other communication systems, such as the future 5G system.

Figure 5:
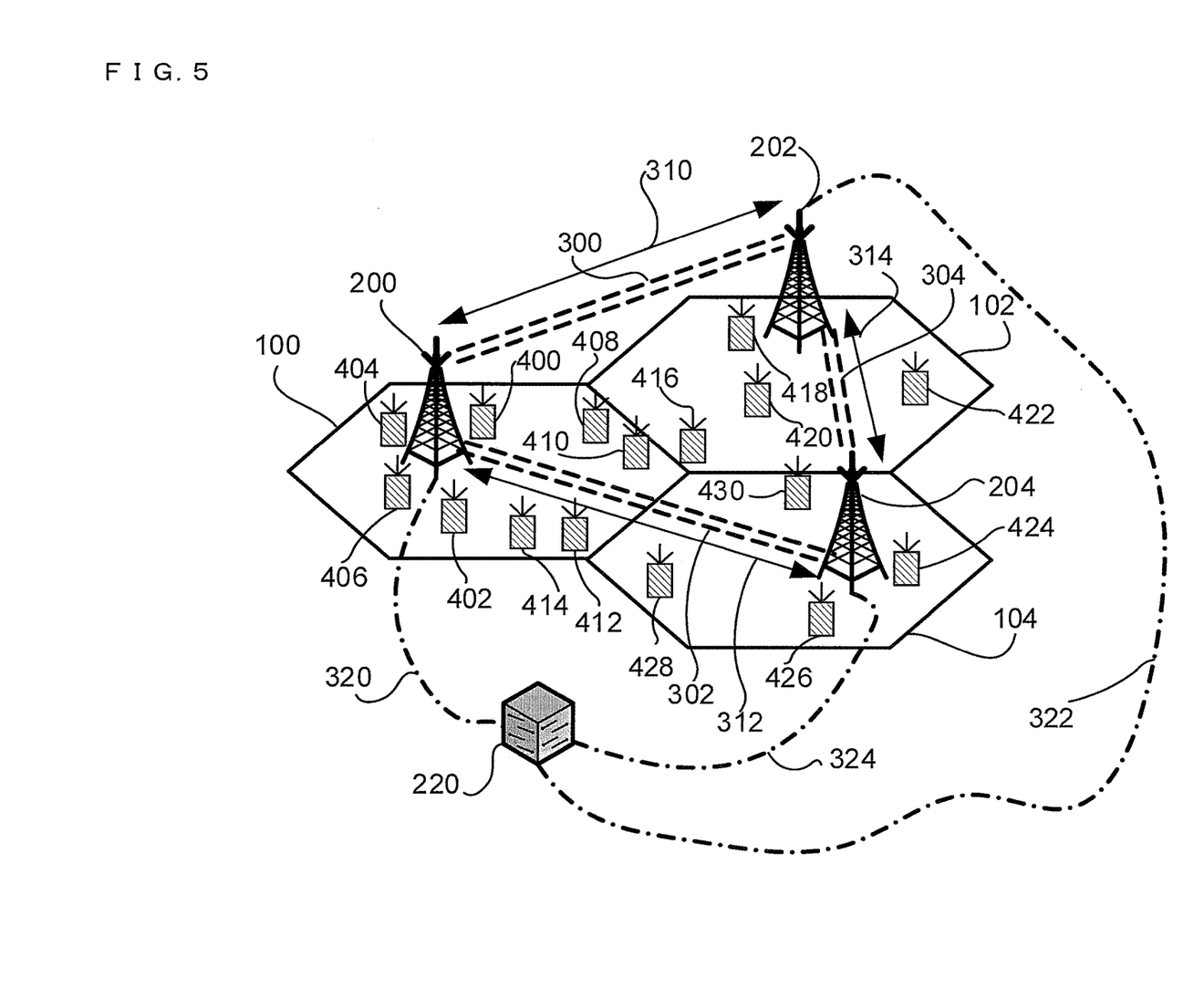
FIG. 5 is a schematic diagram of a multi-cell cellular communication system.

FIG. 5 is a schematic diagram of a multi-cell cellular communication system. The cellular system divides a service coverage area into a number of adjacent wireless coverage areas, i.e., cells. In FIG. 5, the entire service area is formed by cells 100, 102 and 104, each being illustratively shown as a hexagon. Base Stations (BSs) 200, 202 and 204 are associated with the cells 100, 102 and 104, respectively. As known to those skilled in the art, each of the BSs 200-204 includes at least a transmitter and a receiver. Herein, it is to be noted that a BS, which is generally a serving node in a cell, can be an independent BS having a function of resource scheduling, a transmitting node belonging to an independent BS, a relay node (which is generally configured for further enlarging the coverage of a cell), or the like. As illustratively shown in FIG. 5, each of the BSs 200-204 is located in a particular area of the corresponding one of the cells 100-104 and is equipped with an omni-directional antenna. However, in a cell arrangement for the cellular communication system, each of the BSs 200-204 can also be equipped with a directional antenna for directionally covering a partial area of the corresponding one of the cells 100-104, which is commonly referred to as a sector. Thus, the diagram of the multi-cell cellular communication system as shown in FIG. 5 is illustrative only and does not imply that the implementation of the cellular system according to the present invention is limited to the above particular constraints.

As shown in FIG. 5, the BSs 200-204 are connected with each other via X2 interfaces 300, 302 and 304. In a LTE-A system, a three-layer node network architecture including base station, radio network control unit and core network is simplified into a two-layer node architecture in which the function of the radio network control unit is assigned to the base station and a wired interface named "X2" is defined for coordination and communication between base stations.

In FIG. 5, the BSs 200-204 are also connected with each other via air interfaces, A1 interfaces, 310, 312 and 314. In a future communication system, it is possible to introduce a concept of relay node. Relay nodes are connected with each other via wireless interfaces and a base station can be considered as a special relay node. Thus, a wireless interface named "A1" can then be used for coordination and communication between base stations.

Additionally, an upper layer entity 220 of the BSs 200-204 is also shown in FIG. 5, which can be a gateway or another network entity such as mobility management entity. The upper layer entity 220 is connected to the BSs 200-204 via S1 interfaces 320, 322 and 324, respectively. In a LTE system, a wired interface named "S1" is defined for coordination and communication between the upper layer entity and the base station.

A number of User Equipments (UEs) 400-430 are distributed over the cells 100-104, as shown in FIG. 5. As known to those skilled in the art, each of the UEs 400-430 includes a transmitter, a receiver and a mobile terminal control unit. Each of the UEs 400-430 can access the cellular communication system via its serving BS (one of the BSs 200-204). It should be understood that while only 16 UEs are illustratively shown in FIG. 5, there may be a large number of UEs in practice. In this sense, the description of the UEs in FIG. 5 is also for illustrative purpose only. Each of the UEs 400-430 can access the cellular communication network via its serving BS. The BS directly providing communication service to a certain UE is referred to as the serving BS of that UE, while other BSs are referred to non-serving BSs of that UE. The non-serving BSs can function as coordinated BSs of the serving BS and provide communication service to the UE along with the serving BS.

For explanation of this embodiment, the UE 416 is considered. The UE 416 operates in a multi-BS coordination mode, has BS 202 as its serving BS and has BSs 200 and 204 as its coordinated BSs. It is to be noted that this embodiment focuses on the UE 416, which does not imply that the present invention is only applicable to one UE scenario. Rather, the present invention is fully applicable to multi-UE scenario. For example, the inventive method can be applied to the UEs 408, 410, 430 and the like as shown in FIG. 5. In an exemplary scenario, there is one serving BS and two coordinated BSs. However, the present invention is not limited to this. In fact, the present invention is not limited to any specific number of serving BS(s) or coordinated BS(s).

In description of the embodiment, the following scenario of multi-BS coordination is assumed.

Exemplary Scenario: The UE 416 operates in a multi-BS coordination mode, has BS 202 as its serving BS, and has BSs 200 and 204 as its coordinated BSs. The UE 416 can be a single antenna or multi-antenna device.

Figure 6:
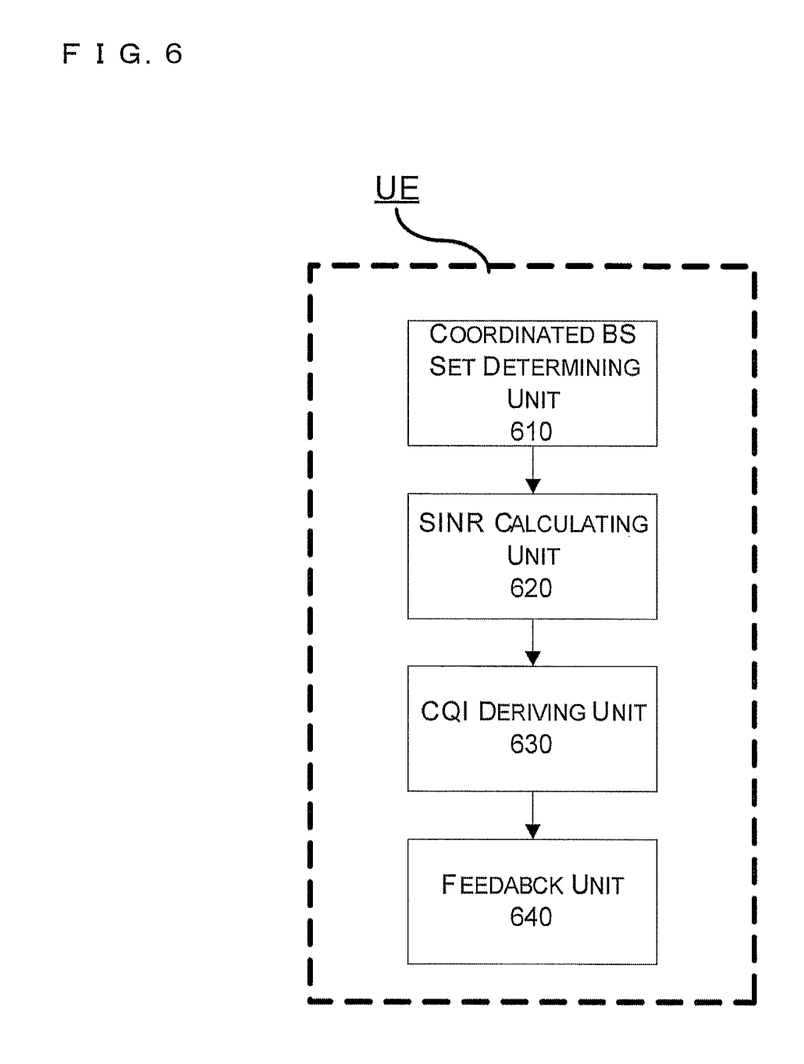
FIG. 6 is a schematic block diagram of a UE according to an embodiment of the present invention.

FIG. 6 is a schematic block diagram of a UE (e.g., UE 416) according to an embodiment of the present invention. The UE includes a coordinated BS set determining unit 610, an SINR calculating unit 620, a CQI deriving unit 630 and a feedback unit 640. In addition, the UE is equipped with one or more antennas (not shown). It can be appreciated by those skilled in the art that the UE further includes other functional units necessary for its operation, such as processor, memory and the like.

The coordinated BS set determining unit 610 is configured for determining a set of coordinated BSs participating multi-BS coordination. The set of coordination BSs contains a serving BS and at least one non-serving BS.

In an embodiment, the UE (e.g., UE 416) can periodically report to the serving BS (e.g., the serving BS 202) path loss information from the UE to its adjacent BSs. Accordingly, the serving BS can estimate the geographic location of the UE from the report, then determine the non-serving BSs in the set of coordinated BSs (e.g., BS 200 and 204) and notify the UE of the non-serving BSs. The UE can obtain the set of coordinated BSs based on the serving BS and the notified non-serving BSs. Alternatively, the UE can determine the non-serving BSs from the measured path loss information, thereby determining the set of coordinated BSs.

The SINR calculating unit 620 is configured for calculating, for each BS in the set of coordinated BSs, an SINR for a channel between a UE and the BS based on a hypothetical BS coordination mode corresponding to the BS.

In an embodiment, the UE can assume a single BS transmission mode without coordination as the hypothetical BS coordination mode for the serving BS in the set of coordinated BSs, so as to calculate the SINR for the channel between the UE and the serving BS. For example, the SINR for the serving BS 202 can be calculated as:

$$SINR_{202} = \frac{S_{202}}{I_{200} + I_{204} + I_0 + N_0} \quad (1)$$

where $S_{202}$ is a signal strength from the serving BS 202 to the UE 416, $I_{200}$ and $I_{204}$ are interference strengths from the non-serving BSs 200 and 204 to the UE 416, respectively, and $I_0+N_0$ is a strength of background interference and noise.

In other words, the SINR calculating unit 620 can be configured for setting the hypothetical BS coordination mode corresponding to the serving BS in the set of coordinated BSs as a single BS transmission mode without coordination and calculating the SINR associated with the serving BS based on the single BS transmission mode without coordination.

On the other hand, the SINR calculating unit 620 can calculate an SINR for each non-serving BS in the set of coordinated BSs based on a hypothetical BS coordination mode corresponding to the non-serving BS. Herein, different non-serving BSs may correspond to same or different hypothetical BS coordination modes, which can be selected and configured by the serving BS or the UE depending on actual communication environment. The hypothetical BS coordination BS modes will be detailed in the following.

In an embodiment, the SINR calculating unit 620 can assume a single BS transmission mode without coordination as the hypothetical BS coordination mode for a non-serving BS in the set of coordinated BSs, so as to calculate the SINR for the channel between the UE and the non-serving BS. For example, the SINR for the non-serving BS 200 can be calculated as:

$$SINR_{200} = \frac{S_{200}}{I_{202} + I_{204} + I_0 + N_0} \quad (2)$$

where $S_{200}$ is a signal strength from the non-serving BS 200 to the UE 416, $I_{202}$ and $I_{204}$ are interference strengths from the BSs 202 and 204 to the UE 416, respectively, and $I_0+N_0$ is a strength of background interference and noise. Accordingly, the SINR for the non-serving BS 204 can be calculated in a similar way. However, it is to be noted that the SINR for the non-serving BS 204 can also be calculated based on another hypothetical BS coordination mode.

In other words, the SINR calculating unit 620 can be configured for setting the hypothetical BS coordination mode corresponding to a non-serving BS in the set of coordinated BSs as a single BS transmission mode without coordination and calculating the SINR associated with the non-serving BS based on the single BS transmission mode without coordination.

In another embodiment, the SINR calculating unit 620 can assume a two-BS Joint Transmission (JT) mode between the serving BS and a non-serving BS in the set of coordinated BSs as the hypothetical BS coordination mode for the non-serving BS, so as to calculate the SINR for the channel between the UE and the non-serving BS.

Herein, the SINR calculating unit 620 can be configured for calculating an SINR for a non-serving BS in consideration of interferences from all other non-serving BSs in the set of coordinated BSs than the non-serving BS. In this way, the SINR for the non-serving BS 200 can be calculated as:

$$SINR_{200} = \frac{S_{202,200}^{JT}}{I_{204} + I_0 + N_0} \quad (3)$$

where $S_{202,200}^{JT}$ is a signal strength to the UE 416 when the signal is transmitted from the non-serving BS 200 and the serving BS 202 in the JT transmission mode, $I_{204}$ is an interference strength from the non-serving BS and 204 to the UE 416, and $I_0+N_0$ is a strength of background interference and noise. Accordingly, the SINR for the non-serving BS 204 can be calculated in a similar way. However, it is to be noted that the SINR for the non-serving BS 204 can also be calculated based on another hypothetical BS coordination mode.

Alternatively, the SINR calculating unit 620 can be configured for calculating an SINR for a non-serving BS in consideration of background interference and noise only. In this way, the SINR for the non-serving BS 200 can be calculated as:

$$SINR_{200} = \frac{S_{202,200}^{JT}}{I_0 + N_0} \quad (4)$$

where $S_{202,200}^{JT}$ is a signal strength to the UE 416 when the signal is transmitted from the non-serving BS 200 and the serving BS 202 in the JT transmission mode, and $I_0+N_0$ is a strength of background interference and noise. Accordingly, the SINR for the non-serving BS 204 can be calculated in a similar way. However, it is to be noted that the SINR for the non-serving BS 204 can also be calculated based on another hypothetical BS coordination mode.

Additionally, it can be seen that, in Equation (3), the signal from the BS 204 is treated as interference; while in Equation (4), the signal from the BS 204 is not treated as interference. In practice, which of Equations (3) and (4) is more accurate depends on whether the BS 204 actually participates in the JT transmission with the serving BS 202 or not. If the BS 204 does not participate in the JT transmission with the serving BS 202, then Equation (3), in which the signal from the BS 204 is treated as interference, is more accurate. Otherwise, Equation (4) is more accurate. The serving BS or the UE can select and configure which of Equations (3) and (4) is to be used in accordance with communication environment.

In other words, the SINR calculating unit 620 can be configured for setting the hypothetical BS coordination mode corresponding to a non-serving BS in the set of coordinated BSs as a multi-BS joint transmission mode and calculating the SINR associated with the non-serving BS based on the multi-BS joint transmission mode.

In another embodiment, the SINR calculating unit 620 can assume a two-BS coordinated beamforming/coordinated scheduling (CB/CS) mode between the serving BS and a non-serving BS in the set of coordinated BSs as the hypothetical BS coordination mode for the non-serving BS, so as to calculate the SINR for the channel between the UE and the non-serving BS.

Herein, the SINR calculating unit 620 can be configured for calculating an SINR for a non-serving BS in consideration of interferences from all other non-serving BSs in the set of coordinated BSs than the non-serving BS. In this way, the SINR for the non-serving BS 200 can be calculated as:

$$SINR_{200} = \frac{S_{202,200}^{CB/CS}}{I_{204} + I_0 + N_0} \quad (5)$$

where $S_{202,200}^{CB/CS}$ is a signal strength to the UE 416 when the signal is transmitted from the non-serving BS 200 and the serving BS 202 in the CB/CS transmission mode, $I_{204}$ is an interference strength from the non-serving BS and 204 to the UE 416, and $I_0+N_0$ is a strength of background interference and noise. Accordingly, the SINR for the non-serving BS 204 can be calculated in a similar way. However, it is to be noted that the SINR for the non-serving BS 204 can also be calculated based on another hypothetical BS coordination mode.

Alternatively, the SINR calculating unit 620 can be configured for calculating an SINR for a non-serving BS in consideration of background interference and noise only. In this way, the SINR for the non-serving BS 200 can be calculated as:

$$SINR_{200} = \frac{S_{202,200}^{CB/CS}}{I_0 + N_0} \quad (6)$$

where $S_{202,200}^{CB/CS}$ is a signal strength to the UE 416 when the signal is transmitted from the non-serving BS 200 and the serving BS 202 in the CB/CS transmission mode, and $I_0+N_0$ is a strength of background interference and noise. Accordingly, the SINR for the non-serving BS 204 can be calculated in a similar way. However, it is to be noted that the SINR for the non-serving BS 204 can also be calculated based on another hypothetical BS coordination mode.

Additionally, it can be seen that, in Equation (5), the signal from the BS 204 is treated as interference; while in Equation (6), the signal from the BS 204 is not treated as interference. In practice, which of Equations (5) and (6) is more accurate depends on whether the BS 204 actually participates in the CB/CS signal transmission with the serving BS 202 or not. If the BS 204 does not participate in the CB/CS transmission with the serving BS 202, then Equation (5), in which the signal from the BS 204 is treated as interference, is more accurate. Otherwise, Equation (6) is more accurate. The serving BS or the UE can select and configure which of Equations (5) and (6) is to be used in accordance with communication environment.

In other words, the SINR calculating unit 620 can be configured for setting the hypothetical BS coordination mode corresponding to a non-serving BS in the set of coordinated BSs as a coordinated beamforming/coordinated scheduling mode and calculating the SINR associated with the non-serving BS based on the coordinated beamforming/coordinated scheduling mode.

In another embodiment, the SINR calculating unit 620 can assume a two-BS dynamic cell selection (DCS) mode between the serving BS and a non-serving BS in the set of coordinated BSs as the hypothetical BS coordination mode for the non-serving BS (in this mode, the signal energy of the serving BS is removed from the interference item), so as to calculate the SINR for the channel between the UE and the non-serving BS.

Herein, the SINR calculating unit 620 can be configured for calculating an SINR for a non-serving BS in consideration of interferences from all other non-serving BSs in the set of coordinated BSs than the non-serving BS. In this way, the SINR for the non-serving BS 200 can be calculated as:

$$SINR_{200} = \frac{S_{200}}{I_{204} + I_0 + N_0} \quad (7)$$

where $S_{200}$ is a signal strength to the UE 416 when the non-serving BS 200 is selected for transmitting signal alone, $I_{204}$ is an interference strength from the non-serving BS and 204 to the UE 416, and $I_0+N_0$ is a strength of background interference and noise. Accordingly, the SINR for the non-serving BS 204 can be calculated in a similar way. However, it is to be noted that the SINR for the non-serving BS 204 can also be calculated based on another hypothetical BS coordination mode.

Alternatively, the SINR calculating unit 620 can be configured for calculating an SINR for a non-serving BS in consideration of background interference and noise only. In this way, the SINR for the non-serving BS 200 can be calculated as:

$$SINR_{200} = \frac{S_{200}}{I_0 + N_0} \quad (8)$$

where $S_{200}$ is a signal strength to the UE 416 when the non-serving BS 200 is selected for transmitting signal alone, and $I_0+N_0$ is a strength of background interference and noise. Accordingly, the SINR for the non-serving BS 204 can be calculated in a similar way. However, it is to be noted that the SINR for the non-serving BS 204 can also be calculated based on another hypothetical BS coordination mode.

Additionally, it can be seen that, in Equation (7), the signal from the BS 204 is treated as interference; while in Equation (8), the signal from the BS 204 is not treated as interference. In practice, which of Equations (7) and (8) is more accurate depends on whether the BS 204 actually participates in the DCS signal transmission with the serving BS 202 or not. If the BS 204 does not participate in the DCS transmission with the serving BS 202, then Equation (7), in which the signal from the BS 204 is treated as interference, is more accurate. Otherwise, Equation (8) is more accurate. The serving BS or the UE can select and configure which of Equations (7) and (8) is to be used in accordance with communication environment.

In other words, the SINR calculating unit 620 can be configured for setting the hypothetical BS coordination mode corresponding to a non-serving BS in the set of coordinated BSs as a dynamic cell selection mode and calculating the SINR associated with the non-serving BS based on the dynamic cell selection mode.

Therefore, in the above embodiments, the SINR calculating unit 620 can be configured for setting the hypothetical BS coordination mode corresponding to each non-serving BS in the set of coordinated BSs as one of a single BS transmission mode without coordination, a multi-BS joint transmission mode, a coordinated beamforming/coordinated scheduling mode and a dynamic cell selection mode.

Further, in the above embodiments, the SINR calculating unit 620 can be configured for calculating an SINR for a non-serving BS corresponding to the single BS transmission mode without coordination, the multi-BS joint transmission mode, the coordinated beamforming/coordinated scheduling mode and the dynamic cell selection mode, in consideration of interferences from all other non-serving BSs in the set of coordinated BSs than the non-serving BS. Alternatively, the SINR calculating unit 620 can be configured for calculating an SINR for a non-serving BS corresponding to the multi-BS joint transmission mode, the coordinated beamforming/coordinated scheduling mode or the dynamic cell selection mode in consideration of background interference and noise only.

It can be appreciated by those skilled in the art that the calculation of SINR by the SINR calculating unit 620 as described above applies to configuration in which the UE, the BS or both have one or more antennas. For a multi-antenna configuration, the SINR calculating unit 620 applies the above Equations (1)-(8) to calculate an SINR for each data stream between the UE and the BS in the multi-antenna configuration, and then provides the SINRs for all data streams associated with the BS as the calculation result of the SINR associated with the BS.

As an example, in the multi-antenna configuration, a number of data streams for the multiple antennas can be generally assumed to have the same interference. In this case, Equation (3) can be converted into:

$$SINR_{200}^i = \frac{S_{202,200}^{JT}}{I_{204} + I_0 + N_0} \quad (9)$$

where $SINR_{200}^i$ is an SINR of the i-th data stream between the non-serving BS 200 and the UE 416, $S_{202,200}^{JT}$ is a signal strength to the UE 416 when the signal is transmitted from the non-serving BS 200 and the serving BS 202 in the JT transmission mode, $I_{204}$ is an interference strength from the non-serving BS and 204 to the UE 416, and $I_0+N_0$ is a strength of background interference and noise. If there are a number, n, of data streams between the non-serving BS 200 and the UE 416, the above Equation (9) can be applied repeatedly for i=1, . . . , n to calculate the SINR for each data stream. Then, the calculated SINRs can be used as the SINR associated with the BS 200.

Similarly, all of the above Equations (1)-(8) can be extended to the multi-antenna configuration, which is apparent to those skilled in the art in light of the teaching the present invention.

In addition, the CQI deriving unit 630 can be configured for deriving, for each BS in the set of coordinated BSs, a CQI corresponding to the calculated SINR.

In particular, the CQI deriving unit 630 can derive a CQI corresponding to the SINR calculated by the SINR calculating unit 620 based on a mapping relationship between SINR and CQI. In other words, the CQI deriving unit 630 obtains quantized CQI values from the mapping between SINR and CQI. Herein, the mapping relationship can be a modulation and coding table in which a modulation and coding level capable of reliable transmission (a packet error rate of 0.1 is generally considered as a reliable transmission) corresponding to an SINR is mapped to a CQI index which is a positive integer. Further, there may be a plurality of different versions of the modulation and coding table, which can be configured by the serving BS via upper layer signaling (e.g., RRC signaling) and/or MAC layer signaling for use. Additionally, the UE can dynamically select the modulation and coding table when feeding back CQI.

Figure 8:
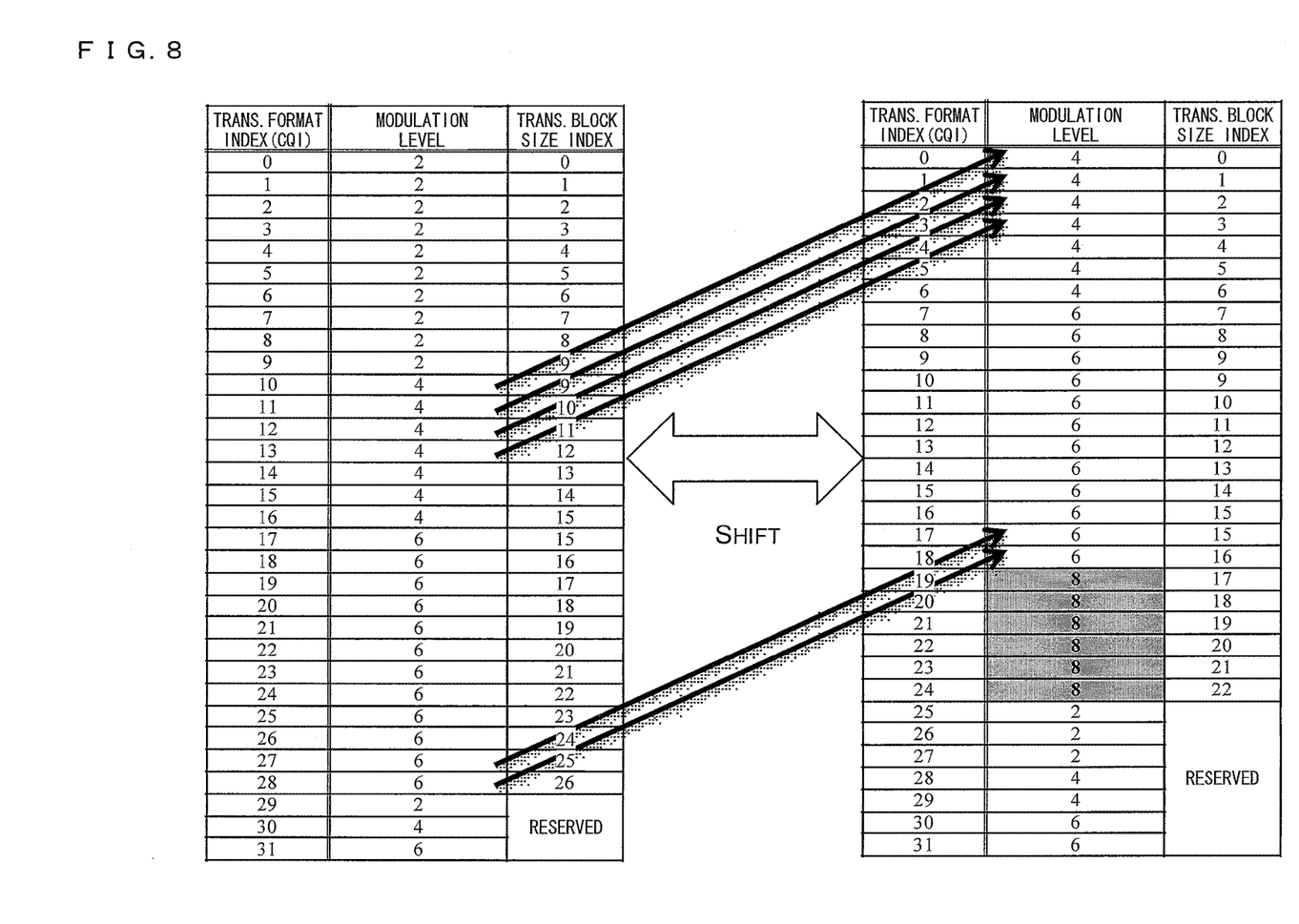
FIG. 8 is a schematic diagram of a modulation and coding table obtained by shift.

Herein, the plurality of different versions of the modulation and coding table as mentioned above can be obtained by shifting a reference modulation and coding table, as shown in FIG. 8. In FIG. 8, the table on the left side is a modulation and coding table used in the current LTE system, in which the transmission format index refers to the modulation and coding index, i.e., CQI. By shifting the table upwards as a whole, another version of modulation and coding table can be obtained, as shown on the right side of FIG. 8. It is to be noted that, in the table on the right side of FIG. 8, the 19-th to the 24-th rows each have a modulation level of 8 (corresponding to 256 QAM modulation), which do not exist in the table on the left side of FIG. 8. This is because that the modulation and coding table is shifted upwards as a whole, resulting in an empty portion in the lower part of the table which needs to be extended filled with higher level modulation and coding schemes. Of course, the modulation and coding table can be shifted downwards as a whole, resulting in an empty portion in the upper part of the table which needs to be extended filled with lower level modulation and coding schemes.

In other words, the CQI deriving unit 630 can be further configured for obtaining the mapping relationship by shifting and extended filling a modulation and coding table in Long Term Evolution (LTE) system.

Figure 9:
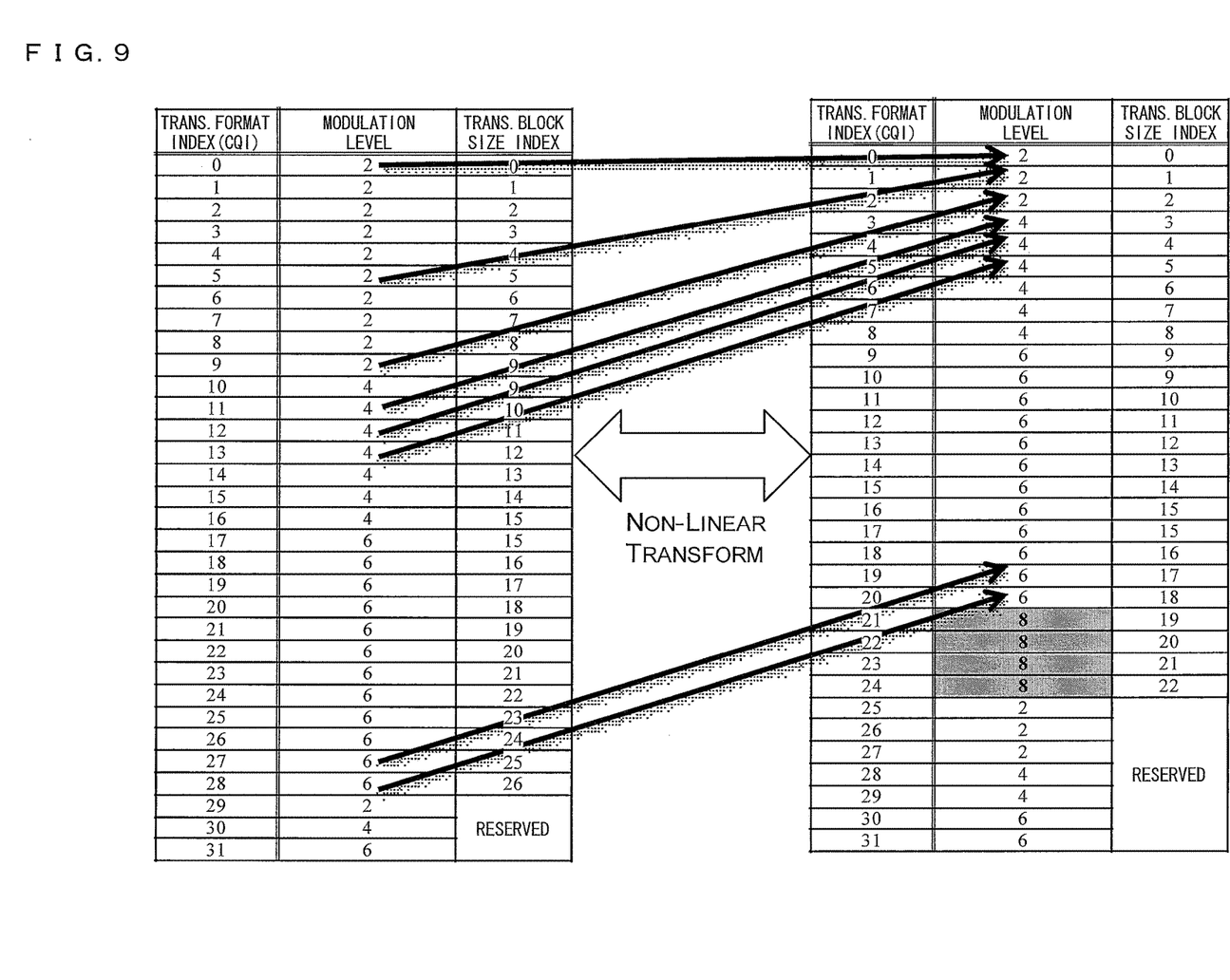
FIG. 9 is a schematic diagram of a modulation and coding table obtained by non-linear transform.

Alternatively, the plurality of different versions of the modulation and coding table as mentioned above can be obtained by selecting, at non-linear intervals, from a reference modulation and coding table, as shown in FIG. 9. In FIG. 9, the table on the left side is a modulation and coding table used in the current LTE system, in which the transmission format index refers to the modulation and coding index, i.e., CQI. By selecting from the upper part of the table at non-linear intervals, another version of modulation and coding table can be obtained, as shown on the right side of FIG. 9. It is to be noted that, in the table on the right side of FIG. 9, the 21-th to the 24-th rows each have a modulation level of 8 (corresponding to 256 QAM modulation), which do not exist in the table on the left side of FIG. 9. This is because that the modulation and coding table is shifted upwards as a whole, resulting in an empty portion in the lower part of the table which needs to be extended filled with higher level modulation and coding schemes. Of course, the modulation and coding table can be shifted downwards as a whole, resulting in an empty portion in the upper part of the table which needs to be extended filled with lower level modulation and coding schemes.

In other words, the CQI deriving unit 630 can be further configured for obtaining the mapping relationship by selecting, at non-linear intervals, and extended filling a modulation and coding table in a Long Term Evolution (LTE) system.

The feedback unit 640 is configured for feeding back the derived CQI to the serving BS.

The feedback unit 640 can be further configured for feeding back phase information associated with each non-serving BS corresponding to the multi-BS joint transmission mode to the serving BS.

In particular, for a non-serving BS configured in the JT mode with the serving BS, the phase information for the non-serving BS at the time of JT signal transmission may need to be fed back. The phase information refers to phase information between BSs in multi-BS JT transmission and is typically fed back using the quantization feedback approach based on codebook space search.

Herein, preferably, the feedback unit 640 can be further configured for replacing, when feeding back the phase information for a non-serving BS, the RI information for the non-serving BS with the phase information, i.e., when reporting the RI for the non-serving BS, discarding the RI and feeding back the phase information instead.

With the above configuration, the UE can achieve CSI feedback in a multi-BS coordination mode. Thus, the serving BS can select the multi-BS coordination mode (e.g., JT, CB/CS or DCS) based on the information fed back from the UE, so as to transmit data to the UE.

It can be appreciated by those skilled in the art that the embodiments of the UE according to the present invention also apply to a configuration in which the UE, the BS or both of them are equipped with one or more antennas. For the multi-antenna configuration, the above processes for calculating SINR, deriving CQI and feedback can be carried out for the respective data streams between the UE and the BS. The specific implementation of the multi-antenna configuration is apparent to those skilled in the art in light of the teaching of the present invention.

Figure 7:
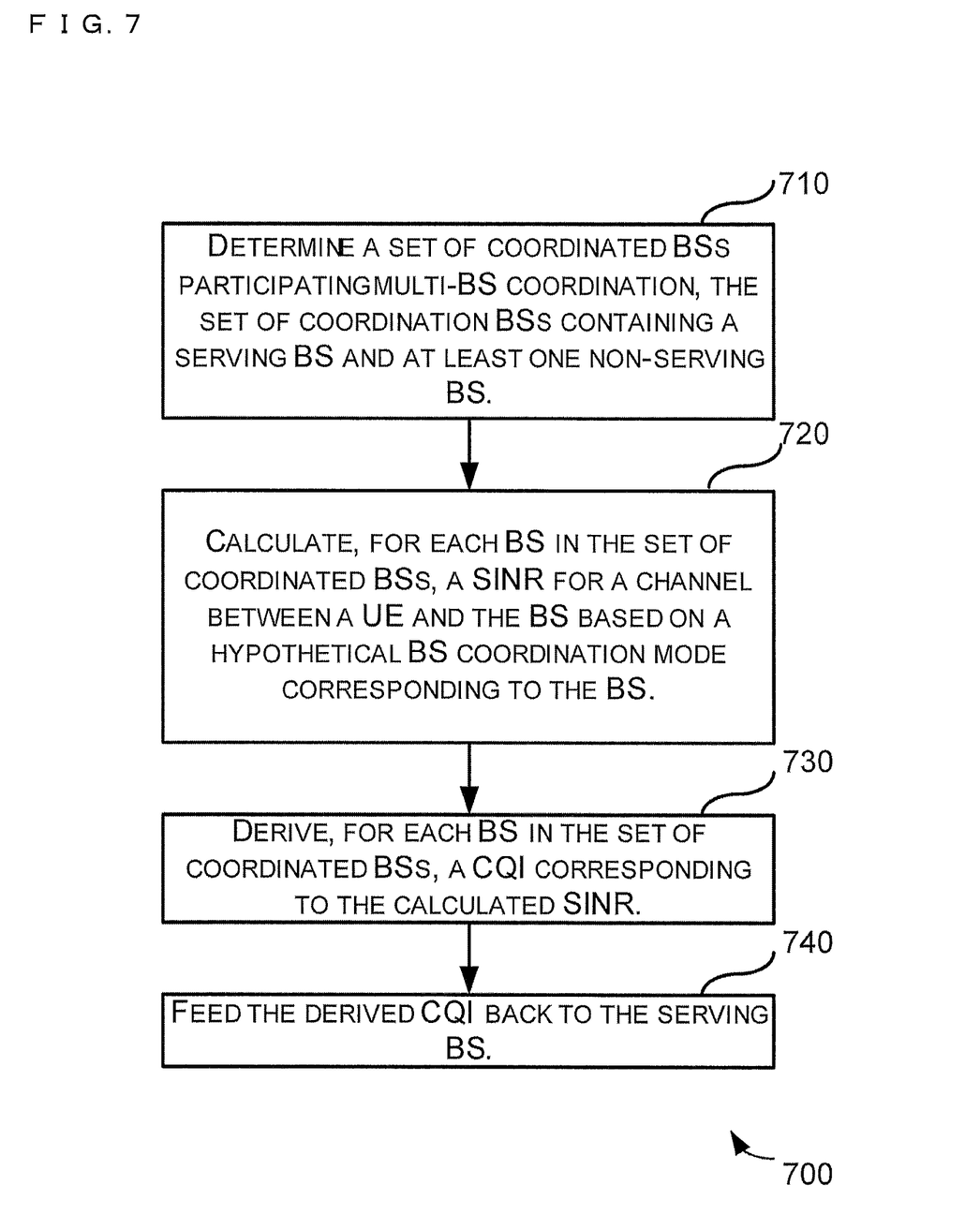
FIG. 7 is a flowchart illustrating the CSI feedback method according to an embodiment of the present invention.

FIG. 7 is a flowchart illustrating the method 700 for CSI feedback according to an embodiment of the present invention. The method of FIG. 7 can be performed by a UE. Thus, the method 700 can be described with reference to the UE of FIG. 6 and includes the following steps.

At step 710, the coordinated BS set determining unit 610 determines a set of coordinated Base Stations (BSs) participating multi-BS coordination. The set of coordination BSs contains a serving BS and at least one non-serving BS.

At step 720, the SINR calculating unit 620 calculates, for each BS in the set of coordinated BSs, an SINR for a channel between a UE and the BS based on a hypothetical BS coordination mode corresponding to the BS.

Specifically, in step 720, the SINR calculating unit 620 sets the hypothetical BS coordination mode corresponding to the serving BS in the set of coordinated BSs as a single BS transmission mode without coordination.

Specifically, in step 720, the SINR calculating unit 620 sets the hypothetical BS coordination mode corresponding to each non-serving BS in the set of coordinated BSs as one of a single BS transmission mode without coordination, a multi-BS joint transmission mode, a coordinated beamforming/coordinated scheduling mode and a dynamic cell selection mode.

Further, in step 720, the SINR calculating unit 620 calculates an SINR for a non-serving BS corresponding to the single BS transmission mode without coordination, the multi-BS joint transmission mode, the coordinated beamforming/coordinated scheduling mode or the dynamic cell selection mode, in consideration of interferences from all other non-serving BSs in the set of coordinated BSs than the non-serving BS.

Alternatively, in step 720, the SINR calculating unit 620 calculates an SINR for a non-serving BS corresponding to the multi-BS joint transmission mode, the coordinated beamforming/coordinated scheduling mode or the dynamic cell selection mode, in consideration of background interference and noise only.

At step 730, the CQI deriving unit 630 derives, for each BS in the set of coordinated BSs, a CQI corresponding to the calculated SINR.

Specifically, in step 730, the CQI deriving unit 630 derives a CQI corresponding to the calculated SINR based on a mapping relationship between SINR and CQI. Herein, the mapping relationship is obtained by shifting and extended filling a modulation and coding table in a Long Term Evolution (LTE) system. As an alternative, the mapping relationship is obtained by selecting, at non-linear intervals, and extended filling a modulation and coding table in a Long Term Evolution (LTE) system.

At step 740, the feedback unit 640 feeds back the derived CQI to the serving BS.

Further, in step 740, the feedback unit 640 can feed back phase information associated with each non-serving BS corresponding to the multi-BS joint transmission mode to the serving BS.

The method 700 for CSI feedback according to the present invention can achieve CSI feedback in a multi-BS coordination mode. Thus, the serving BS can select the multi-BS coordination mode (e.g., JT, CB/CS or DCS) based on the information fed back from the UE, so as to transmit data to the UE.

It can be appreciated by those skilled in the art that the embodiments of the CSI feedback method according to the present invention also apply to a configuration in which the UE, the BS or both of them are equipped with one or more antennas. For the multi-antenna configuration, the above processes for calculating SINR, deriving CQI and feedback can be carried out for the respective data streams between the UE and the BS. The specific implementation of the multi-antenna configuration is apparent to those skilled in the art in light of the teaching of the present invention.

It should be noted that the solution of the present invention has been described above by a way of example only. However, the present invention is not limited to the above steps and element structures. It is possible to adjust, add and remove the steps and elements structures depending on actual requirements. Thus, some of the steps and elements are not essential for achieving the general inventive concept of the present invention. Therefore, the features necessary for the present invention is only limited to a minimum requirement for achieving the general inventive concept of the present invention, rather than the above specific examples.

The present invention has been described above with reference to the preferred embodiments thereof. It should be understood that various modifications, alternations and additions can be made by those skilled in the art without departing from the spirits and scope of the present invention. Therefore, the scope of the present invention is not limited to the above particular embodiments but only defined by the claims as attached.

The invention claimed is:

1. A terminal apparatus configured to communicate with a base station apparatus, comprising:
    a processor; and
    memory in electronic communication with the processor, wherein instructions stored in the memory are executable by the processor to:
    derive a Channel Quality Indicator (CQI) index which indicates a CQI on the basis of at least:
        a CQI table, and
        a combination of information indicating a modulation scheme and information indicating a transport block size, and
    report the CQI, wherein
    the CQI table is determined from a first CQI table and a second CQI table on the basis of a higher layer signal,
    the first CQI table and the second CQI table indicate a correspondence between a CQI index and combinations of information indicating a modulation scheme and information indicating a transport block size,
    a modulation order of a modulation scheme indicated by the second CQI table is higher than any modulation orders of modulation schemes indicated by the first CQI table,
    the modulation scheme indicated by the second CQI table includes 256 Quadrature Amplitude Modulation, and
    the processor additionally selects either the first CQI table or the second CQI table for each individual sub frame.

2. The terminal apparatus according to claim 1, wherein the instructions are executed by the processor to:
    communicate with a plurality of base station apparatuses that include a serving base station apparatus and at least one non-serving base station apparatus,
    derive a CQI index for each of the plurality of base station apparatuses, and
    report the CQI to each of the plurality of base station apparatuses.

3. The terminal apparatus according to claim 1, wherein the second CQI table is obtained by selecting, at non-linear intervals, from the first CQI table and by filling correspondence between a CQI index and a combination of information indicating a transport block size and information indicating a modulation scheme whose modulation order is higher than any modulation orders of modulation schemes indicated by the first CQI table.

4. A communication method of a terminal apparatus configured to communicate with a base station apparatus, the communication method comprising:
    deriving a Channel Quality Indicator (CQI) index which indicates a CQI on the basis of at least:
        a CQI table, and
        a combination of information indicating a modulation scheme and information indicating a transport block size, and
    reporting the CQI, wherein
    the CQI table is determined from a first CQI table and a second CQI table on the basis of a higher layer signal,
    the first CQI table and the second CQI table indicate a correspondence between a CQI index and combinations of information indicating a modulation scheme and information indicating a transport block size,
    a modulation order of a modulation scheme indicated by the second CQI table is higher than any modulation orders of modulation schemes indicated by the first CQI table,
    the modulation scheme indicated by the second CQI table includes 256 Quadrature Amplitude Modulation, and
    one of the first CQI table and the second CQI table is selected for each individual sub frame.

* * * * *